US012265915B2

(12) United States Patent
Liu et al.

(10) Patent No.: US 12,265,915 B2
(45) Date of Patent: *Apr. 1, 2025

(54) COMPOSABLE NEURAL NETWORK KERNELS

(71) Applicant: Advanced Micro Devices, Inc., Santa Clara, CA (US)

(72) Inventors: Chao Liu, Austin, TX (US); Daniel Isamu Lowell, Austin, TX (US); Wen Heng Chung, Austin, TX (US); Jing Zhang, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/138,709

(22) Filed: Dec. 30, 2020

(65) Prior Publication Data

US 2021/0117806 A1 Apr. 22, 2021

Related U.S. Application Data

(63) Continuation-in-part of application No. 16/779,557, filed on Jan. 31, 2020.
(Continued)

(51) Int. Cl.
*G06N 3/10* (2006.01)
*G06F 8/41* (2018.01)
*G06F 17/16* (2006.01)

(52) U.S. Cl.
CPC ............. *G06N 3/10* (2013.01); *G06F 8/41* (2013.01); *G06F 17/16* (2013.01)

(58) Field of Classification Search
CPC . G06F 8/41; G06F 8/443; G06F 17/16; G06F 9/3001; G06F 9/30032;
(Continued)

(56) References Cited

U.S. PATENT DOCUMENTS 6,367,069 B1 4/2002 Corbett
9,753,762 B1 9/2017 Emelyanov
(Continued)

FOREIGN PATENT DOCUMENTS

CN 109 886 399 A 6/2019
WO 2020/200244 A1 10/2020

OTHER PUBLICATIONS

De Almeida Maia, H., et al., "A Video Tensor Self-descriptor Based on Block Matching", International Conference on Computational Science and Its Applications, Jun. 2014; retrieved on Sep. 10, 2020 from <URL: https://doi.org/10.1007/978-3-319-09153-2_30> pp. 401-408.
(Continued)

*Primary Examiner* — Wei Y Zhen
*Assistant Examiner* — Mohammed N Huda
(74) *Attorney, Agent, or Firm* — Volpe Koenig

(57) ABSTRACT

A technique for manipulating a generic tensor is provided. The technique includes receiving a first request to perform a first operation on a generic tensor descriptor associated with the generic tensor, responsive to the first request, performing the first operation on the generic tensor descriptor, receiving a second request to perform a second operation on generic tensor raw data associated with the generic tensor, and responsive to the second request, performing the second operation on the generic tensor raw data, the performing the second operation including mapping a tensor coordinate specified by the second request to a memory address, the mapping including evaluating a delta function to determine an address delta value to add to a previously determined address for a previously processed tensor coordinate.

22 Claims, 8 Drawing Sheets

Related U.S. Application Data

(60) Provisional application No. 63/024,376, filed on May 13, 2020, provisional application No. 62/927,603, filed on Oct. 29, 2019, provisional application No. 62/925,168, filed on Oct. 23, 2019, provisional application No. 62/867,766, filed on Jun. 27, 2019.

(58) Field of Classification Search
CPC ............ G06F 9/30036; G06F 9/30038; G06F 9/30043; G06F 9/30192; G06F 9/3887; G06F 9/3888; G06F 9/38885; G06N 3/04; G06N 3/063; G06N 3/10; G06N 3/045; G06N 3/105
USPC ............................ 706/15, 706; 717/172, 152
See application file for complete search history.

(56) References Cited

U.S. PATENT DOCUMENTS

| | | | | |
|---|---|---|---|---|
| 2015/0370544 | A1* | 12/2015 | Santry et al. ............. | G06F 8/41 717/145 |
| 2016/0232175 | A1 | 8/2016 | Zhou et al. | |
| 2016/0323199 | A1 | 11/2016 | Bryant et al. | |
| 2018/0322386 | A1* | 11/2018 | Sridharan et al. ....... | G06N 3/04 |
| 2019/0042940 | A1 | 2/2019 | Sakairi et al. | |
| 2019/0130270 | A1* | 5/2019 | Nicol et al. ............ | G06N 3/063 |

OTHER PUBLICATIONS

Gardner, J., et al., "Driving with Data: Modeling and Forecasting Vehicle Fleet Maintenance in Detroit", arXiv:1710.06839v1; Oct. 18, 2017; retrieved on Sep. 10, 2020 from <URL: https://arxiv.org.1710.06839V1.pdf> sections 2-4 and figures 2-3.

Mota, V. F., et al., "A tensor montion descriptor based on histograms of gradients and optical flow", Pattern Recognition Letters, vol. 39, Issue 1, Apr. 2014; retrieved on Sep. 10, 2020 from <URL: https://doi.org/10/1016/j. patrec.2013.08.008> pp. 1-11.

Asakawa Shinichi, "Experience Deep Learning with Python-Caffe, Theano, Chainer, TensorFlow-," First Edition, Corona Publishing Co., Ltd. Publication date 2016010/25, pp. 33, 37, Independent Book 2018-00275-001.

Ariyama Keiji, "Getting Started with TensorFlow3 Object Detection", First Edition, Impress R&D, Publication date Feb. 16, 2018, p. 13, Independet Book 2020-01302-001.

* cited by examiner

COMPOSABLE NEURAL NETWORK KERNELS

CROSS-REFERENCE TO RELATED APPLICATIONS

This application claims the benefit of U.S. Non-Provisional application Ser. No. 16/779,557, entitled "COMPOSABLE NEURAL NETWORK KERNELS," filed on Jan. 31, 2020, the entirety of which is hereby incorporated herein by reference, which claims the benefit of U.S. Provisional Patent Application 62/867,766, entitled "COMPOSABLE NEURAL NETWORK KERNELS," filed on Jun. 27, 2019, the entirety of which is hereby incorporated herein by reference, U.S. Provisional Patent Application 62/925,168, entitled "TENSOR COORDINATE SPACE TRANSFORMATION IN NEURAL NETWORKS," filed on Oct. 23, 2019, the entirety of which is hereby incorporated herein by reference, and U.S. Provisional Patent Application 62/927,603, entitled "TENSOR COORDINATE SPACE TRANSFORMATION IN NEURAL NETWORKS," filed on Oct. 29, 2019, the entirety of which is hereby incorporated herein by reference. This application also claims the benefit of U.S. Provisional Patent Application No. 63/024,376, entitled "TENSOR COORDINATE SPACE TRANSFORMATION IN NEURAL NETWORKS," filed on May 13, 2020, the entirety of which is hereby incorporated herein by reference.

BACKGROUND

The ever-increasing demand for compute power by modern neural networks has ignited a race for developing faster and more efficient hardware and software stacks for high performance computing for neural networks. However, the different varieties of neural network computation makes this a daunting task. First, neural networks are often comprised of complex computation on tensors, and different networks may use different types of tensor computations. Second, there are vast varieties of dimensionalities, sizes and choices of data layout in memory for these tensors. Third, the computations need to be run on a large variety of existing and emerging hardware efficiently. Improvements to calculations for neural networks are needed.

BRIEF DESCRIPTION OF THE DRAWINGS

A more detailed understanding is provided by the following description, given by way of example in conjunction with the accompanying drawings wherein.

DETAILED DESCRIPTION

A technique for manipulating a generic tensor is provided. The technique includes receiving a first request to perform a first operation on a generic tensor descriptor associated with the generic tensor, responsive to the first request, performing the first operation on the generic tensor descriptor, receiving a second request to perform a second operation on generic tensor raw data associated with the generic tensor, and responsive to the second request, performing the second operation on the generic tensor raw data, the performing the second operation including mapping a tensor coordinate specified by the second request to a memory address, the mapping including evaluating a delta function to determine an address delta value to add to a previously determined address for a previously processed tensor coordinate.

Figure 1:
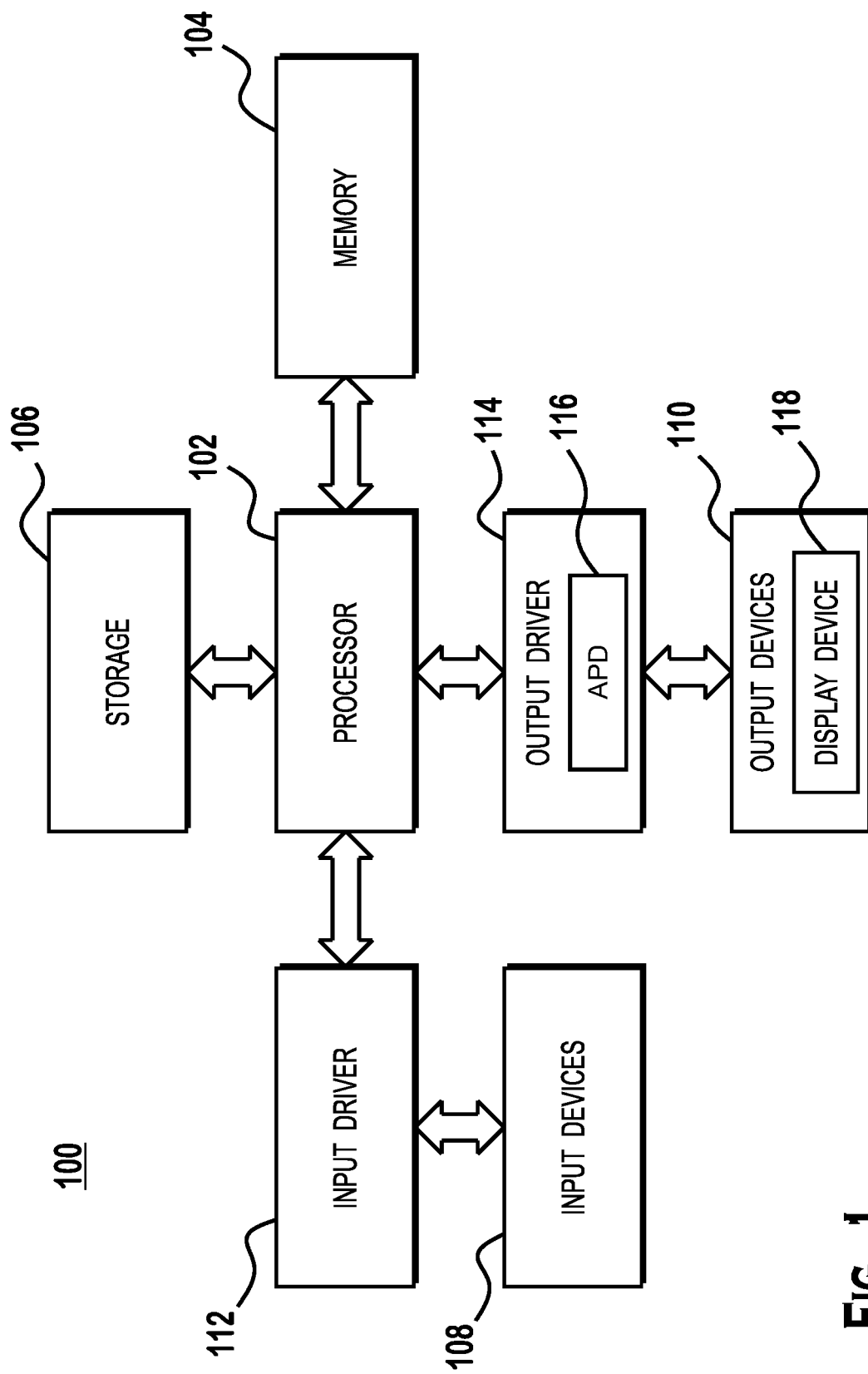
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein.

Figure 2:
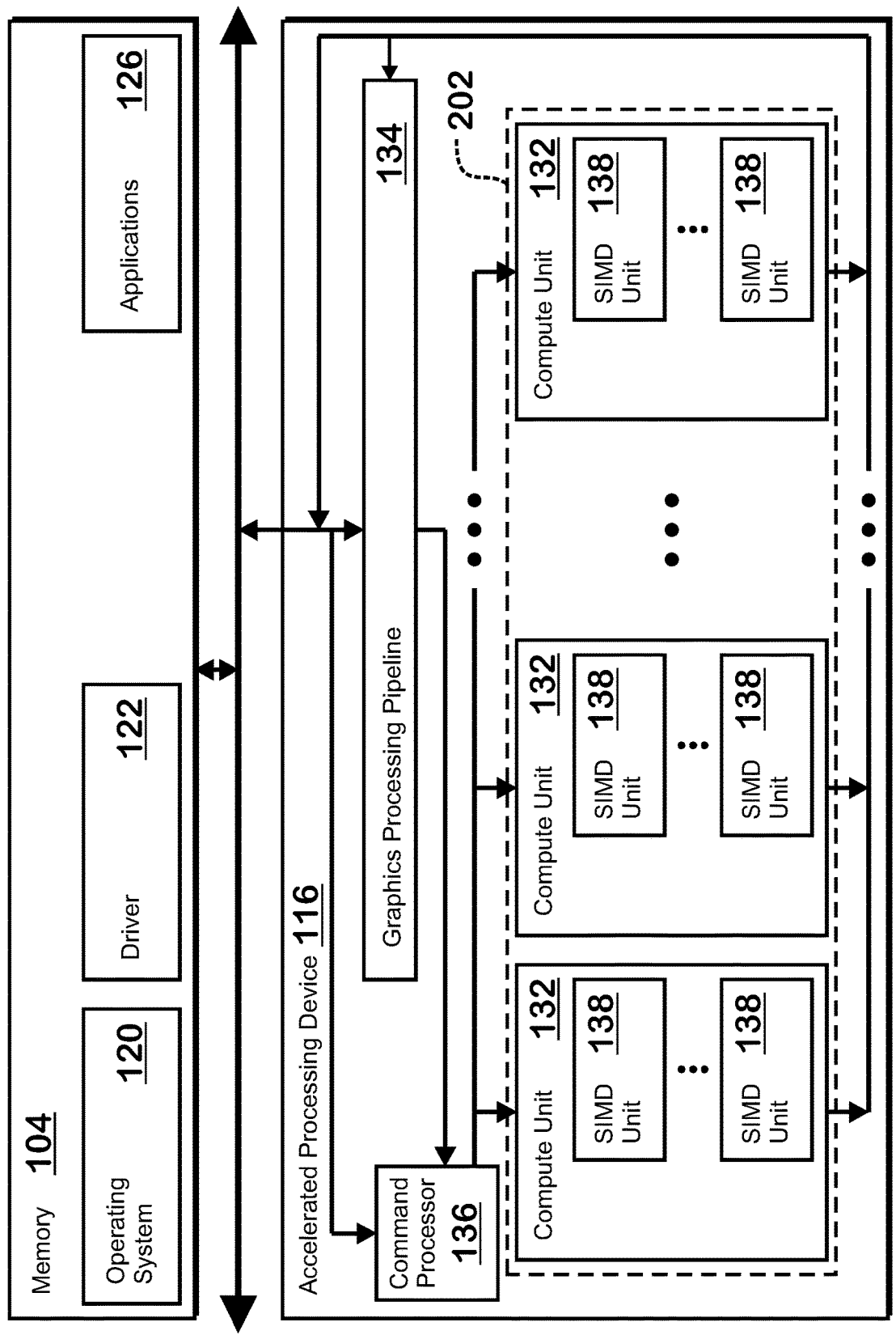
FIG. 2 is a block diagram of the device of FIG. 1, illustrating additional details related to execution of processing tasks on an accelerated processing device, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not related, or not directly related to graphics operations, such as operations related to video, physics simulations, computational fluid dynamics, or other tasks, based on commands received from the processor 102. The APD 116 also executes compute processing operations that are related to ray tracing-based graphics rendering.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed together as a "wavefront" on a single SIMD processing unit 138. The SIMD nature of the SIMD processing unit 138 means that multiple work-items typically execute in parallel simultaneously. Work-items that are executed together in this manner on a single SIMD unit are part of the same wavefront. In some implementations or modes of operation, a SIMD unit 138 executes a wavefront by executing each of the work-items of the wavefront simultaneously. In other implementations or modes of operation, a SIMD unit 138 executes different sub-sets of the work-items in a wavefront in parallel. In an example, a wavefront includes 64 work-items and the SIMD unit 138 has 16 lanes (where each lane is a unit of the hardware sized to execute a single work-item). In this example, the SIMD unit 138 executes the wavefront by executing 16 work-items simultaneously, 4 times.

One or more wavefronts are included in a "workgroup," which includes a collection of work-items designated to execute the same program. An application or other entity (a "host") requests that shader programs be executed by the accelerated processing device 116, specifying a "size" (number of work-items), and the command processor 136 generates one or more workgroups to execute that work. In various implementations, any or all of the number of workgroups, number of wavefronts in each workgroup, and number of work-items in each wavefront are dependent on the size of work requested by the host. In one example, a number of work-items in a workgroup is specified along with the size of a particular request to execute a shader program. In that instance, the APD 116 spawns a number of workgroups based on this size and number of work-items per workgroup. As stated above, the command processor 136 dispatches workgroups to one or more compute units 132, which execute the appropriate number of wavefronts to complete the workgroups. In some implementations, each workgroup is confined to a single compute unit 132.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

In various implementations, any of the systems described above are used to perform calculations for implementing artificial neural networks. Neural networks are modeled as interconnected layers of neurons. Each layer has connectivity to a previous layer (or to inputs to the network) and a subsequent layer (or to outputs of the network). Each neuron has one or more inputs. Each input is an input value from a previous layer or the input to the neural network. Each input has an associated weight. Each neuron also defines neuron functions, which define how the inputs and weights combine to generate an output.

The present disclosure presents a number of operations that can be combined to compose artificial neural network "kernels," where the term "kernel" means a program, portion of code, or hardware operation. In some situations, kernels are executed many times on very large chunks of data. In an example, one kernel performs computations for determining outputs from the neurons for a particular layer of a neural network. Some kernels execute as individual programs or threads on central processing unit or graphics processing unit. Other kernels are application programming interface ("API") calls. Other kernels are hardware (fixed-function circuitry)-implemented operations that can be invoked by instructions in an instruction set architecture. Yet other kernels are operations performed by a compiler.

The individual operations are, in various implementations, performed by any of the following entities: software code executing on a programmable processor (e.g., a CPU or a GPU), a compiler, hardware that performs the operations in response to an invocation such as an API call, hardware that performs the operations as hardware instructions (e.g., as part of an instruction set architecture), or any other entity.

Some operations are operations that act not on the generic tensor raw data, itself, but instead on the generic tensor descriptor. Such operations include the following: slice, strided slice, reorder, unfold, merge, embed, pad, and move slicing window. As an example of these operations, the slice operator "slices out" a given portion of a tensor to make a new generic tensor descriptor. Specifically, a slice modifies a generic tensor descriptor by limiting the possible index values in one or more dimensions, but the slice does not operate on the tensor raw data. The range of possible indices index to which indexing is limited in the sliced tensor is called a "slicing window." The number of possible index values in the given dimension is called the "length of a slicing window" in that dimension. In the above example, one example slice limits the possible index values in the z dimension to 0 through 3 (out of 0 through 7). A different example slice limits the possible index values in the x dimension to 0 and in the y dimension to 0 and 1.

To facilitate computational processing of data through one or more neurons of a particular layer, the data involved is stored in memory in a particular data format. Specifically, the inputs, weights, and outputs are stored as tensors having specific data formats. A tensor, also called "normal tensor" in this document, includes a defined number of dimensions. Each dimension has a stride and a length. Addressing a tensor occurs using one index for each dimension. The length for a dimension is the number of distinct index values in that dimension. The stride for a dimension determines the increment of memory address for each increment of index value in that dimension. In an example, a 3D tensor has three-dimensions: one for x, y, and z, having lengths Lx, Ly, and Lz, respectively. In the x dimension, the stride is Sx, in the y dimension, the stride is Sy, and in the z dimension, the stride is Sz. The element index for x, y, and z dimension are Ix, Iy, and Iz respectively. This would correspond to a layout in which: increasing x dimension index Ix by 1 corresponds to an increment in memory address of Sx*data type size, increasing y dimension index Iy by 1 corresponds to an increment in memory address of Sy*data type size, increasing z dimension index Iz by 1 corresponds to an increment in memory address of Sz*data type size, where data type size is the size of data type of tensor element, such as 4 bytes for a single precision floating point value, 2 bytes for a half precision floating point value, and so on. The data organized in the memory layout just described is referred to as "normal tensor raw data" herein. More specifically, the normal tensor raw data is simply the data elements of a tensor laid out in memory addresses as just described.

The tuple of the indices in the x, y, and z dimensions (Ix, Iy, Iz) in this 3D tensor example, is called a multi-dimensional index, or "multi-index." The normal tensor in this example includes Lx*Ly*Lz number of elements, whose multi-index ranges from (0, 0, 0) to (Lx−1, Ly−1, Lz−1). The element with a multi-index of (0, 0, 0) is called the "point of origin" of the tensor. The distance of memory addresses between an element to the "point of origin" divided by data size type is called "offset" of the element. The "offset" of an element, whose multi-index is (Ix, Iy, Iz), can be calculated to be Ix*Sx+Iy*Sy+Iz*Sz.

A "generic tensor" is an extension to the definition of "normal tensor." A "generic tensor" has a defined number of dimensions. Each dimension has a length, but in some circumstances, one or more dimensions do not have a constant stride. A generic tensor is described both by a generic tensor descriptor and generic tensor raw data. A generic tensor descriptor indicates the number of dimensions of the generic tensor, the lengths for each dimension, and a base address for the generic tensor raw data that the generic tensor descriptor is associated with. In addition, a generic tensor descriptor also provides a means to calculate the memory "offset" of a tensor raw data that is associated with a multi-index. Thus, a generic tensor descriptor indicates the manner in which a multi-index maps to generic tensor raw data as stored in memory. The generic tensor descriptor facilitates proper mapping of elements of a multi-index to elements of generic tensor raw data. Indicating the generic tensor type also indicates the manner in which the multi-index of the generic tensor descriptor maps to the generic tensor raw data. A normal tensor is described elsewhere herein. With a generic tensor stored in memory, the point of origin corresponds to the base address of the generic tensor.

Put more formally, a generic tensor T is a n-dimensional Cartesian grid structure, with $l_i$ number of points along the i-th dimension. The vector $\vec{l}=(l_0, l_1, \ldots, l_{n-1})^T$ is called the "length vector" of the generic tensor. A vector of integer numbers $\vec{x}=(x_0, x_1, \ldots, x_{n-1})^T$, where $0 \leq x_i < l_i$, for i=0, 1, . . . , n−1, uniquely identifies one point in the grid. The vector of integer numbers is referred to as "tensor coordinate" or "multi index" of the generic tensor. The point with the tensor coordinate of $(0, 0, \ldots, 0)^T$ is called the "point of origin" of the generic tensor.

Each point of a generic tensor T is associated with one memory address, and thus, there is mapping from a tensor coordinate $\vec{x}=(x_0, x_1, \ldots, x_{n-1})^T$ to a memory address y, written as g: $\vec{x} \to y$. The set of all tensor coordinates of generic tensor T is X={$\vec{x} \in \mathbb{Z}^n | 0 \leq x_i < l_i$, for i=0, . . . n−1}, and is sometimes referred to as the "tensor coordinate space" of T. The set of all associated memory addresses Y is sometimes referred to as the "memory address space" of T. Because a memory address is represented as an integer on computer, $Y \subset \mathbb{Z}$ (that is, the set of all memory addresses Y is a subset of the set of integers).

The function g: X→Y is referred to as the "address function" of the generic tensor T. The "generic tensor descriptor" of T is the implementation of the address function g: X→Y. The address function maps the set of all tensor coordinates of a generic tensor T to the set of all memory addresses associated with the generic tensor T.

Note that it is possible that the address function g: X→Y would sometimes cause several different tensor coordinates to be mapped to the same memory address, indicating the mapping is sometimes not unique. It is also possible that the mapping is not valid for some tensor coordinates, indicating these tensor coordinates are not mapped to any physical memory address.

A "normal tensor" is a generic tensor. Moreover, for a normal tensor, the mapping from a tensor coordinate to its memory address is always valid. Also, for a normal tensor, different tensor coordinates are mapped to different memory addresses. More specifically, for a normal tensor with length vector of $\vec{l} = (l_0, l_1, \ldots, l_{n-1})^T$, the address function that maps tensor coordinate $\vec{x} = (x_0, x_1, x_{n-1})^T$ to its memory address is g: $\vec{x} \to \Sigma_{i=0}^{n-1} s_i x_i + \alpha = \vec{s} \cdot \vec{x} + \alpha$, where $s_i > 0$, for $i = 0, 1, \ldots, n-1$, and $s_i \le (s_{i-1} \cdot l_{i-1})$, for $i = 1, \ldots, n-1$. $s_i$ is referred to as the "stride" of this normal tensor on the i-th dimension. The term "stride vector" of a normal tensor refers to the vector of $\vec{s} = (s_0, s_1, \ldots, s_{n-1})^T$. Tensor coordinate $(0, 0, \ldots, 0)^T$ is mapped to memory address $\alpha$.

In an example, a generic tensor descriptor A has a number of dimensions of n, a length vector $\vec{l} = (l_0, l_1, \ldots, l_{n-1})^T$, and the "tensor coordinate space" of A being a set of n-dimensional integer vectors, the tensor coordinate space being $X = \{\vec{x} \in \mathbb{Z}^n | 0 \le x_i < l_i$, for $i = 0, n-1\}$. The memory address space of A is Y, and $Y \in \mathbb{Z}$. A is an implementation of address function g: $X \to Y$. The memory address associated with tensor coordinate $\vec{x}$ can be calculated using $y = g(\vec{x})$.

A set of m-dimensional integer vectors $W = \{\vec{w} \in \mathbb{Z}_m | 0 \le w_i < \lambda_i$, for $i = 0, \ldots, m-1\}$ is defined, where $\lambda_i$ is a positive integer, for $i = 0, \ldots, m-1$. If there is a function $f: W \to X$ (i.e., a function that maps the set of m-dimensional integer vectors W to the "tensor coordinate space" of generic tensor descriptor A mentioned above), then the mapping from W into memory address space Y would be (g∘f): $W \to Y$. In other words, the combination of g and f maps from W to X and then from X to Y.

A second generic tenor descriptor B is defined as: B has a length vector of $\vec{\lambda} = (\lambda_0, \lambda_1, \ldots, \lambda_{n-1})^T$ and tensor coordinate space W. The generic tensor descriptor B maps tensor coordinate space W to memory space as g∘f: $W \to Y$. In other words, B is a generic tensor descriptor that maps tensor coordinate space W to memory space Y. More specifically, generic tensor descriptor B can be thought of as being constructed using generic tensor descriptor A, which maps coordinate space X to memory address space Y as g: $X \to Y$, and the function $f: W \to X$ that maps coordinate space W to X.

The function g: $X \to Y$ is the address function associated with the generic tensor descriptor A. The function (g∘f): $W \to Y$ is the address function associated with generic tensor descriptor B. The function $f: W \to X$ is referred to as a "transformation function" here, which transforms generic tensor descriptor A into B.

The memory address y corresponding to tensor coordinate W (of coordinate space W) is calculated as:

$$\begin{cases} \vec{x} = f(\vec{w}) \\ y = g(\vec{x}) \end{cases}$$

In other words, the memory address corresponding to tensor coordinate $\vec{w}$ is obtained by applying the function f to $\vec{w}$ to obtain tensor coordinate $\vec{x}$ (of coordinate space X) and then applying g to $\vec{x}$ to obtain the memory address y.

The "delta functions" of $f$ and g are defined as $f_\Delta$ and $g_\Delta$:

$$\begin{cases} f_\Delta: (\vec{w}, \Delta\vec{w}) \to f(\vec{w} + \Delta\vec{w}) - f(\vec{w}) \\ g_\Delta: (\vec{x}, \Delta\vec{x}) \to g(\vec{x} + \Delta\vec{x}) - g(\vec{w}) \end{cases}$$

In other words, a delta function defines, for a given arbitrary difference or "delta amount" (e.g., $\Delta\vec{w}$ or $\Delta\vec{x}$), and a given function (e.g., f or g), the difference between the function value of a value plus the delta of that value (e.g., $f(\vec{w} + \Delta\vec{w})$) and the function of the value. In other words, in the example shown, the delta function defines the difference between $f(\vec{w} + \Delta\vec{w})$ and $f(\vec{w})$.

If the transformation function $f: W \to X$ is a linear function, then $f_\Delta$ is a function of $\Delta\vec{w}$ only:

$$\Delta\vec{x} = f_\Delta(\Delta\vec{w}), \text{ if } f: W \to X \text{ is linear}$$

If the address function g: $X \to Y$ is a linear function, $g_\Delta$ is a function of $\Delta\vec{x}$ only:

$$\Delta y = g_\Delta(\Delta\vec{x}), \text{ if } g: X \to Y \text{ is linear}$$

Note that if A is a normal tensor descriptor, then g: $X \to Y$ is always a linear function g: $\vec{x} \to \vec{s} \cdot \vec{x} + \alpha$, where $\vec{s}$ is the stride vector of normal tensor, and $\alpha$ is the memory address of the point of origin of A. In this case, the delta function of g: $X \to Y$ is $g_\Delta$: $\overrightarrow{\Delta x} \to \Delta y = \vec{s} \cdot \overrightarrow{\Delta x}$.

Furthermore, any number of transformation functions can be chained and applied to an existing generic tensor descriptor to construct a series of new generic tensor descriptors. In this example, $T^0$ is a generic tensor whose address function is g: $\vec{x}^0 \to y$. In addition, $f^1: \vec{x}^1 \to \vec{x}_0, f^2: \vec{x}^2 \to \vec{x}^1, \ldots, f^k: \vec{x}^k \to \vec{x}^{k-1}$ are a series of transformation functions. Since a generic tensor can be defined using tensor raw data and an address function, a series of generic tensors $T^1, \ldots, T^k$ can be defined by combing these transformation functions with the address function g: $\vec{x}^0 \to y$ for $T^0$. More specifically, $T^j$ (for $j = 1, \ldots, k$) is a generic tensor whose address function is (g∘f^1∘ ... ∘f^j): $\vec{x}^j \to y$, and occupies the same part of physical memory as the original generic tensor $T^0$. In other words, constructing a new generic tensor through transformation functions involves operations only on generic tensor descriptor, and does not involve any operation on tensor raw data in the physical memory.

Continuing the example, address calculation for an element in the generic tensor $T^k$ is, in some instances, performed as follows. A memory address associated with element $T^k(\vec{x}^k)$ is calculated as:

$$\vec{x}^{k-1} = f^k(x^k), \ldots, \vec{x}^0 = f^1(\vec{x}^1), y = g(\vec{x}^0)$$

Once a memory address has been calculated as above for $x^k$ to obtain address y, a new memory address associated with a different element of the generic tensor $T^k(x^k + \Delta x^k)$ can be calculated as $\Delta\vec{x}^{k-1} = f_\Delta^k(\vec{x}_k, \overrightarrow{\Delta x^k}) = f_\Delta^1(\vec{x}^1, \overrightarrow{\Delta x^1})$, $\Delta y = g_\Delta(\vec{x}^0, \overrightarrow{\Delta x^0})$. $y_{new} = y + \Delta y$.

In sum, use of delta functions allows for a more efficient calculation of memory addresses for generic tensors that are formed by chaining together multiple transformation functions, by adding a delta value (e.g., $\Delta y$), determined based on the delta functions for the multiple transformation functions, to the an already calculated memory address for a different tensor coordinate. More specifically, if tensor coordinate $x^k$ maps to memory address y, and it is desired to calculate an address mapping for $x^k + \Delta x^k$, then such calculation is performed by adding Δy to y. Δy is calculated based on the delta function for these transformations.

Several transformation operations that can be performed on generic tensor descriptors are now provided. Each of these operations transforms a generic tensor descriptor into a new generic tensor descriptor. Multiple transformations of any kind can be chained together and applied to any generic tensor descriptor to create a new generic tensor descriptor. The resulting generic tensor descriptor is associated with the same tensor raw data as the original tensor descriptor. These operations do not operate on the generic tensor raw data in memory.

Several transformations that apply to generic tensor descriptor are defined here. They are pad, merge, embed, reorder, slice, strided slice, and fold.

A pad transformation increases the length on each dimension by adding imaginary points on the boundaries.

For a n-dimensional generic tensor descriptor A with length vector $\vec{l}=(l_0, l_1, \ldots, l_{n-1})^T$, the tensor coordinate space of A is $X=\{\vec{x} \in \mathbb{Z}^n | 0 \leq x_i < l_i, \text{ for } i=0, \ldots n-1\}$.

Left $p_i$ and $q_i$ be the numbers of points added to the left and right side of the boundaries on the i-th dimension. Let $\vec{p}=(p_0, p_1, \ldots, p_{n-1})^T$ and let $\vec{q}=(q_0, q_1, \ldots, q_{n-1})^T$. The transformed generic tensor descriptor B has a length vector $\vec{\lambda}=\vec{l}+\vec{p}+\vec{q}$. The tensor coordinate space of B is $W=\{\vec{w} \in \mathbb{Z}^n | 0 \leq w_i < \lambda_i, \text{ for } i=0, \ldots n-1\}$.

$f:\vec{w} \to \vec{x}$ is considered valid only in non-padding area $\{\mathbb{Z} \in \vec{x}^n | p_i \leq w_i < p_i + l_i, \text{ for } i=0, \ldots n-1\}$, because only $\vec{w}$ in the non-padding area is mapped to $\vec{x} \in X$. If $\vec{w}$ is invalid, the memory address $\vec{w}$ is mapped to is also invalid, any write into that memory address will be ignored, and any read from that memory address will return a preset value (for example, 0).

The transformation function $f:\vec{w} \to \vec{x}$ is a linear function:

$$\vec{x}=\vec{w}-\vec{p}$$

The delta function of transformation function $f_\Delta:(\overrightarrow{\Delta w}) \to \overrightarrow{\Delta x}$ is $$\overrightarrow{\Delta x}=\overrightarrow{\Delta w}$$

A merge transformation combines some or all dimensions of a generic tensor descriptor A into a single "merged" dimension, the resulting generic tensor descriptor B has fewer dimensions than A. The generic tensor descriptor B is capable of being indexed with a multi-index, but at least one index value of the multi-index is a scalar value applied to a merged dimension generated from multiple individual dimensions of A.

For example, for an n-dimensional generic tensor descriptor A with length vector $\vec{l}=(l_0, l_1, \ldots, l_{n-1})^T$, the tensor coordinate space of A is $X=\{\vec{x} \in \mathbb{Z}^n | 0 \leq x_i < l_i, \text{ for } i=0, \ldots n-1\}$. If merging all the n dimensions into one dimension, then the resulting transformed generic tensor descriptor B has a single dimension, has length vector $\vec{\lambda}=(\lambda_0)^T$, where $\lambda_0 = \Pi_{j=0}^{n-1} l_j$, and the tensor coordinate space of B is $W=\{w_0 \in \mathbb{Z}^1 | 0 \leq w_0 < \lambda_0\}$.

Let $$\mu_i = \begin{cases} 1, & \text{if } i = n-1 \\ \mu_{i+1} \cdot l_{i+1}, & \text{for } i = n-2, n-3, \ldots, 0 \end{cases}$$

then the transformation function $f:w_0 \to \vec{x}$ is a non-linear function, and can be calculated recursively by:

$$x_i = \text{floor}\left(\left(w_0 - \sum_{j=0}^{i-1}(\mu_j \cdot x_j)\right)/\mu_i\right), \text{ for } i = 0, 1, \ldots, n-1$$

where floor(v) is the floor function, which takes as input a real number v and gives as output the greatest integer less than or equal to v. This function requires integer division, which is usually order of magnitude more computationally expensive than operation like integer add, subtraction and multiplication.

The delta function $f_\Delta: (\Delta w_0, \vec{x}) \to \overrightarrow{\Delta x}$ can be implemented without expensive integer division, using the pseudo code below. Note that since $f:w_0 \to \vec{x}$ is a non-linear function, the delta function $f_\Delta:(\Delta w_0, \vec{x}) \to \overrightarrow{\Delta x}$ is a function of both $\Delta w_0$ and $\vec{x}$.

TABLE 1

| Example pseudo-code |
| --- |
| Pseudo code 1: for scenario when $\Delta w_0 \geq 0$ |
| Input: $\Delta w_0$, $\vec{x}$<br>Output: $\overrightarrow{\Delta x}$<br>SET carry to false<br>SET i to n − 1<br>REPEAT<br>  IF carry<br>    SET $u_i$ to $z_i$ + 1<br>  ELSE<br>    SET $u_i$ to $z_i$<br>  ENDIF<br>  SET carry to ($x_i + u_i \geq l_i$)<br>  If carry<br>    SET $\Delta x_i$ to $u_i - l_i$<br>  ELSE<br>    SET $\Delta x_i$ to $u_i$<br>  ENDIF<br>  DECREASE i by 1<br>UNTIL i = 0 |
| Pseudo code 2: for scenario when $\Delta w_0 < 0$ |
| Input: $\Delta w_0$, $\vec{x}$<br>Output: $\overrightarrow{\Delta x}$<br>SET borrow to false<br>SET i to n − 1<br>REPEAT<br>  IF borrow<br>    SET $u_i$ to $z_i - 1$<br>  ELSE<br>    SET $u_i$ to $z_i$<br>  ENDIF<br>  SET borrow to ($x_i + u_i < 0$)<br>  If borrow<br>    SET $\Delta x_i$ to $u_i + l_i$<br>  ELSE<br>    SET $\Delta x_i$ to $u_i$<br>  ENDIF<br>  DECREASE i by 1<br>UNTIL i = 0 | where $z_i$ for i=0, 1, ..., n−1, is calculated recursively as:

$$z_i = \text{floor}\left(\frac{\left(\Delta w_0 - \sum_{j=0}^{i-1}(\mu_j \cdot z_j)\right)}{\mu_i}\right), \text{ for } i = 0, 1, \ldots, n-1$$

The calculation of $z_i$ still requires integer divisions. However, if a kernel implementation chooses to use fixed values for the choices of $\Delta w_0$, then $\vec{z}$ $(z_0, z_1, \ldots, z_{n-1})^T$ is computed once for the entire generic tensor descriptor B, and therefore its cost of integer division in calculating $\vec{z}$ can be amortized.

An implication of using "Merge" transformation is that the resulting generic tensor descriptor no longer has a constant stride vector. This is due to the fact that transformation function of Merge transformation $f:w_0 \to \vec{x}$ is a non-linear function of $\vec{x}$. To explain the non-constant stride for "merged" tensor descriptor, in an example, a source tensor descriptor A is a 3-dimensional normal tensor descriptor. Note that any transformation function in the writing, including "merge" transformation function can be applied to any generic tensor descriptor, but for simplicity of the discussion, the source tensor descriptor A is a normal tensor descriptor. Continuing the example, A is a 3-dimensional normal tensor descriptor, and the 3 dimensions are X, Y and Z dimensions. A has a length vector $\vec{l} = (l_X, l_Y, l_Z)^T = (2, 4, 8)^T$, and a stride vector $\vec{s} = (s_X, s_Y, s_Z)^T = (100, 10, 1)^T$. This normal tensor has $l_X * l_Y * l_Z = 64$ elements, whose multi-indices range from (0, 0, 0) to (1, 3, 7). In an example merge operation, the merge operation selects dimensions Y and Z, and generates a merged tensor in which dimensions Y and Z act as a single dimension, which, for example, is referred to here as the W dimension. Generic tensor descriptor B, with 2 dimensions: X and W dimension, is thus created. This generic tensor descriptor B has an X length of $l_X = 2$, an X stride of $s_X = 100$ and a range of X indices $i_X$ from 0 to $l_X - 1$ (which equals 1). Note, the X length and X stride of the generic tensor descriptor B are the same as the normal tensor descriptor A.

The generic tensor descriptor B has a W length of $l_W = l_Y * l_Z = 32$, and the W dimension index $i_W$, which is mapped from indices Y and Z $(i_Y, i_Z)$ as $i_W = l_Z * i_Y + i_Z = 8 * i_Y + i_Z$, has a range from 0 to 31. Conversely, the mapping from index $i_W$ to indices $(i_Y, i_Z)$ can be expressed as $i_Y = i_W / l_Z = i_W / 8$, and $i_Z = i_W - l_Z * i_Y = i_W - 8 * i_Y = i_W - 8 * i_Y$. Note that there is not a constant W stride on the merged W dimension, because increasing the W dimension index $i_W$ by 1 will not always increase the memory offset by a constant number. Instead, the increment to the offset when incrementing the $i_W$ by 1 depends on the value of index $i_Z$. More specifically, by increasing $i_W$ by 1, the increment to the offset is $S_Z = 1$ if $i_Z < l_Z - 1 = 7$, but the increment is $s_Y - (l_Z - 1) * s_Z = 3$ if $i_Z = l_Z - 1 = 7$.

The selections of dimensions to be merged is specified by the merge transformation. When accessing data of generic tensor B, obtaining the offset into the generic tensor raw data occurs by converting the multi-index $(i_X, i_W)$ of the generic tensor B into the address space of the tensor raw data, which can occur in any technically feasible manner. In one example, the merged multi-index $(i_X, i_W)$ for the generic tensor B into is converted into a corresponding multi-index $(i_X, i_Y, L_Z)$ for the normal tensor A, which is then converted to a memory offset. In another example, the increment of the merged multi-index $(i_X, i_W)$, which is $(\Delta i_X, \Delta i_W)$, is converted into the increment of the multi-index $(i_X, i_Y, i_Z)$, which is $(\Delta i_X, \Delta i_Y, \Delta i_Z)$, which is then converted into the increment for the memory offset. The rules for these index conversions are determined based on the transformation functions used to generate the generic tensor descriptor. Generally, a merge reduces the dimensionality of a source tensor descriptor.

An "embed" transformation takes an input generic tensor descriptor and creates a new generic tensor descriptor that has more dimensions. More specifically, to generate an "embedded" generic tensor descriptor, one dimension of the source generic tensor descriptor is selected, and that dimension is "embedded" into multiple dimensions of the resulting "embedded" generic tensor descriptor, so that the selected dimension in the source generic tensor descriptor acts as if the selected dimension includes multiple dimensions in the "embedded" tensor descriptor.

Note that any transformation function in the writing, including "embed" transformation, can be applied to any generic tensor descriptor, but for simplicity of the discussion, the source tensor descriptor is assumed to be a normal tensor descriptor. An embed operation selects one of the dimensions of a source generic tensor, referred to here by way of example as the x dimension, which has a length of Lx and a stride of Sx, and generates $w_0, w_1, \ldots w_{n-1}$ dimensions from the x dimension, where the $w_0$ dimension has a length of $Lw_0$, the $w_1$ dimension has a length of $Lw_1$, $w_2$ dimension has a length of $Lw_2$, and so on. The value of n, as well as the lengths of the $w_0, w_1, \ldots w_{n-1}$ dimensions $Lw_0, Lw_1, \ldots Lw_{n-1}$ are specified by the embed operation. The mapping from the indices of the $w_0, w_1, \ldots w_{n-1}$ dimensions $(Iw_0, Iw_1, \ldots Iw_{n-1})$ to the index of the x dimension Ix is $Ix = E_0 * Iw_0 + E_1 * Iw_1 + \ldots + E_{n-1} * Iw_{n-1} + E_n$. Here, $E_0, E_1 \ldots E_n$ are called "embed coefficients", which are integer numbers, and their values are also specified by the embed operation.

Note that it is possible for elements of an embedded tensor to overlap in memory. That means that different values of indices $(Iw_0, Iw_1, \ldots Iw_{n-1})$ are sometimes mapped to a same value of index Ix, which is then mapped to a same memory location.

Figures 2A, 2B:
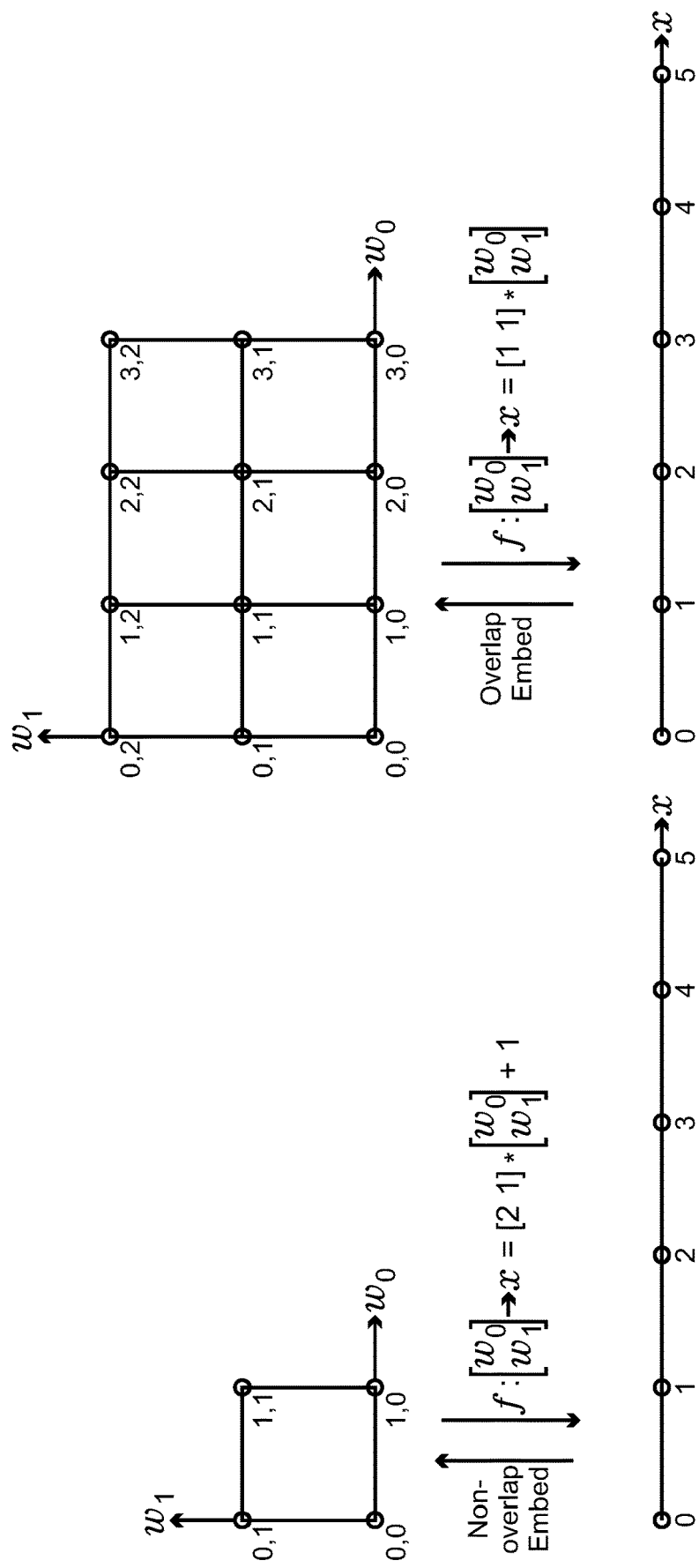
FIG. 2A illustrates an example embed operation.
FIG. 2B illustrates an example embed operation.

As an example embed operation, illustrated in FIG. 2A, a 2-D normal tensor has x and y dimensions, the lengths of x and y dimensions are Lx=6 and Ly=10, and the strides of x and y dimensions are Sx=10 and Sy=1. The normal tensor has Lx*Ly=60 elements, whose multi-indices range from (0, 0) to (5, 9). In an example embed operation, the embed operation selects x dimension of the input normal tensor and embeds x dimension into two dimensions: $w_0$ and $w_1$ dimensions. The embed operation set the lengths of $w_0$, $w_1$ dimensions be $Lw_0 = 2$ and $Lw_1 = 2$, and sets the embed coefficients to be $E_0 = 2$, $E_1 = 1$ and $E_2 = 1$. The resulting embedded tensor descriptor created by the embed operation is a 3-D embedded tensor descriptor with $w_0$, $w_1$ and y dimensions. The mapping from the indices of $w_0$ and $w_1$ dimension $(Iw_0, Iw_2)$ to index of x dimension Ix is $Ix = E_0 * Iw_0 + E_1 * Iw_1 + E_2 = 2 * Iw_0 + Iw_1 + 1$. The lengths of the embedded tensor descriptor are $Lw_0 = 2$, $Lw_1 = 2$ and Ly=10 for $w_0$, $w_1$ and y dimensions respectively. The strides of the embedded tensor descriptor are $Sw_0 = E_0 * Sx = 20$, $Sw_1 = E_1 * Sx = 10$ and Sy=1 for $w_0$, $w_1$ and y dimensions respectively. Note that resulting embedded tensor has $Lw_0 * Lw_1 * Ly = 40$ elements, whose multi-indices range from (0, 0, 0) to (1, 1, 9). The embedded tensor has less elements than the original normal tensor (40 vs 60). Each element of the embedded tensor are mapped to a unique element of the source normal tensor, but some elements of the source normal tensor are not mapped from any element of the embedded tensor.

In a second example embed operation, illustrated in FIG. 2B, with the same source normal tensor but a different embed operation, a different embedded tensor with elements overlapping in memory is created. In this example, an embed operation selects the x dimension of the input normal tensor and embeds the x dimension into two dimensions: $w_0$ and $w_1$ dimensions. The embed operation sets the lengths of $w_0$, $w_1$ dimensions as $Lw_0=3$ and $Lw_1=4$, and sets the embed coefficients to be $E_0=1$, $E_1=1$ and $E_2=0$. The resulting embedded tensor descriptor created by the embed operation is a 3-D embedded tensor descriptor with $w_0$, $w_1$ and y dimensions. The mapping from the indices of $w_0$ and $w_1$ dimension ($Iw_0$, $Iw_2$) to the index of the x dimension Ix is $Ix=E_0*Iw_0+E_1*Iw_1+E_2=Iw_0+Iw_1$. The lengths of the embedded tensor descriptor are $Lw_0=3$, $Lw_1=4$ and $Ly=10$ for $w_0$, $w_1$ and y dimensions respectively. The strides of the embedded tensor descriptor are $Sw_0=E_0*Sx=10$, $Sw_1=E_1*Sx=10$ and $Sy=1$ for $w_0$, $w_1$ and y dimensions respectively. Note that the resulting embedded tensor has $Lw_0*Lw_1*Ly=120$ elements, whose multi-indices range from (0, 0, 0) to (2, 3, 9). Although the resulting embedded tensor includes the same tensor raw data in memory as the original normal tensor, the embedded tensor has more elements than the original normal tensor (120 vs 60), because some different elements of the embedded tensors are mapped to the same elements of the source normal tensor, which are then mapped to the same memory locations.

A formal definition of the "embed" transformation function and the delta function of the "embed" transformation are provided here. These definitions are also valid for a scenario where the source generic tensor descriptor is not a "normal" tensor descriptor. For an embed operation, the transformation function $f:\vec{w} \to \vec{x}$ is a linear function:

$$x_0 = \sum_{i=0}^{n-1}(e_i w_i) + e_n,$$

where $\vec{e} = (e_0, e_1, \ldots, e_n)^T$ are coefficients of integer values specified by embed operation itself, which are referred to as "embed coefficient" in the example above. Given certain value of $\vec{e}$, $f:\vec{w} \to \vec{x}$ may map different $\vec{w}$ into the same $\vec{x}$.

The delta function of transformation function $\beta_f:(\overrightarrow{\Delta w}) \to \overrightarrow{\Delta x}$ is $$\Delta x_0 = \sum_{i=0}^{n-1}(e_i \Delta w_i)$$

A slice transformation reduces the range of the source generic tensor descriptor. Specifically, a slice constructs a new generic tensor descriptor by limiting the possible index values in one or more dimensions, but a slice does not operate on the tensor raw data. The range of possible indices index to which indexing is limited in the sliced tensor is called a "slicing window." The number of possible index values in the given dimension is called the "length of a slicing window" in that dimension.

A strided slice transformation is an extension to slice. Like slice, a strided slice limits the possible index value in one or more dimensions, but the range of the limited index is not always contiguous. For example, a strided slice with "stride factor" equal to 2, and with slicing window length of 3, in a tensor with z dimension length 7, will limit the range of z dimension index to 0, 2, and 4.

The transformation function $f:\vec{w} \to \vec{x}$ for slice and strided slice is a linear function:

$$\vec{x} = \begin{bmatrix} e_0 & & \\ & \ddots & \\ & & e_{n-1} \end{bmatrix} \cdot \vec{w} + \vec{p}$$

Where $\vec{e} = (e_0, e_1, \ldots, e_{n-1})^T$ are integer values given by slice transformation, and are referred to as "stride factors" in the example above. For slice transformation, $e_i=1$ for $i=0, \ldots n-1$. For strided slice, at least one of $e_i$ is not 1. $\vec{p} = (p_0, p_1, \ldots, p_{n-1})^T$ are also integer values given by slice transformation, and $p_i$ is the value of the smallest index on the i-th dimension inside the "slicing window" of source generic tensor descriptor.

The delta function of transformation function $f_\Delta:(\overrightarrow{\Delta w}) \to \overrightarrow{\Delta x}$ is $$\Delta \vec{x} = \begin{bmatrix} e_0 & & \\ & \ddots & \\ & & e_{n-1} \end{bmatrix} \cdot \overrightarrow{\Delta w}$$

A reorder (also called "permute") transformation operation changes the order of the dimensions of a generic tensor descriptor. For example, a 3-D normal tensor "TensorA" with x, y, and z being its first, second and third dimension, has lengths of Lx, Ly and Lz, and strides of Sx, Sy, and Sz on its first, second and third dimensions. A reorder operation creates a new generic tensor "TensorB" with a new order of dimensions, where, for example, z, y, and x are its first, second and third dimension. TensorB has lengths of Lz, Ly, and Lx, and strides of Sz, Sy, Sx on its first, second, and third dimension. "TensorA" and "TensorB" share the same tensor raw data in memory. An element of TensorA with multi-index of (Ix, Iy, Iz) has the same memory address as the element of TensorB with multi-index of (Iz, Iy, Ix).

Additional details regarding reorder operations are now provided. A permute/reorder transformation reorders the dimension of a generic tensor descriptor to generate another generic tensor descriptor.

The transformation function $f:\vec{w} \to \vec{x}$ is a linear function $$\vec{x} = P\vec{w},$$

where P is the permutation matrix.

The delta function of transformation function $f_\Delta: (\overrightarrow{\Delta w}) \to \overrightarrow{\Delta x}$ is $$\overrightarrow{\Delta x} = P\overrightarrow{\Delta w}$$

A fold operation increases the dimensionality of a generic tensor descriptor by creating additional dimensions from a single dimension. The product of the lengths of the resulting dimensions is equal to the length of the dimension to be folded. The lengths of the resulting dimensions can be chosen in any way. As an example, the source generic tensor descriptor A are one-dimensional. Let $\vec{l} = (l_0, l_1, \ldots, l_{n-1})^T$ be the "length vector" of the resulting generic tensor descriptor B, and tis specified by the fold transformation.

The transformation function $f:\vec{w} \to \vec{x}$ is a linear function:

$$x_0 = \sum_{j=0}^{n-1}(\mu_i w_i)$$

where $$\mu_i = \begin{cases} 1, & \text{if } i = n-1 \\ \mu_{i+1} \cdot l_{j+1}, & \text{for } i = n-2, n-3, \ldots, 0 \end{cases}$$

The transformation function $f:\vec{w} \to \vec{x}$ of a "fold" transformation is always one-to-one mapping. This is in contrast to the "embed" transformation defined above, whose transformation function may be many-to-one mapping.

The delta function of transformation function $f_A:(\overrightarrow{\Delta w}) \to \overrightarrow{\Delta x}$ is $$\Delta x_0 = \Sigma_{i=0}^{n-1}(\mu_i \Delta w_i)$$

In summary, several transformation operations that apply to generic tensor descriptors are defined. A pad transformation increases the length on each dimension by adding imaginary points on the boundaries. A merge transformation creates a merged tensor descriptor from another generic tensor descriptor. Specifically, the merge operation reduces at least some of the dimensions of a generic tensor descriptor down to 1. The concept of merged tensor is described elsewhere herein. The transformation function of a merge transformation is a non-linear function, as a result, and resulting tensor descriptor does not a constant memory stride on the "merged" dimension. An embed transformation embeds one dimension of the input tensor into multiple dimensions to create an embedded tensor. The transformation function of a embed transformation may be many-to-one mapping, as a result, and resulting tensor descriptor may map multiple elements into the same memory address. A slice and strided slice transformation reduce the range of a tensor by limiting the index range of the source tensor descriptor. A fold transformation increases the dimensionality of a generic tensor descriptor by creating additional dimensions from a single dimension. A reorder (also called "permute") transformation changes the order of the dimensions of a generic tensor descriptor. In addition, the movement of sliding window operation sets the window the set of index values—for which a slice operation is to occur. Note that the generic tensor descriptor is essentially a means for addressing data in a generic tensor raw data.

The following operations act on the actual tensor raw data itself—that is, the following operations act on the data in generic tensor raw data: sliced copy; general matrix multiply ("GEMM") or batched GEMM on 2D or 3D generic tensors; reduction of an n-dimensional generic tensor; and algorithm specific transformations of an n-dimensional generic tensor.

The sliced copy operation create new generic tensor raw data, or modify existing generic tensor raw data (for example, by using atomic add). This operation first creates a slicing window on one tensor (source tensor) and another slicing window on another tensor (destination tensor). The concept of "slicing window" is the same as the one defined in slice transformation for generic tensor descriptor. The sliced copy operation then uses the tensor raw data from the slicing window of the source tensor to set or modify (for example, atomic add) raw data inside the slice window of destination tensor, on per-element basis.

The GEMM ("general matrix-matrix multiplication") operation on 2-D generic tensors and batched GEMM operation on 3-D generic tensor referred in this writing are extensions of their traditional definitions. Note that both the inputs and result of a GEMM or batched GEMM operations referred in this writing are generic tensors. In contrast, in the traditional definition of these operations, both inputs and result tensor must be "normal" tensors. These operations generate new generic tensor raw data based on the matrix multiplication of two input generic tensors (raw data and generic tensor descriptors).

The generic tensor reduction operation takes multiple input generic tensors with the same number of dimensions, and the same length on each of the dimensions, and reduces these multiple input generic tensors to a single output generic tensor with the same number of dimensions and the same length on each of the dimensions as the multiple input generic tensors. Each of the elements with multi-index (Ix, Iy, Iz) of the output generic tensor is the result of reduction of the elements with multi-index (Ix, Iy, Iz) from all the input generic tensors. A reduction operation on elements can be: max, min, summation, and so on.

For any of the above operations, the resulting tensor is written into any memory, including memories that are different than the memory from which the operand tensors originated.

In some implementations, the operations are API functions that can be called by software. In some implementations, the operations are operations performed by a compiler at compile-time. In some implementations, the operations that act on the generic tensor descriptor are compile-time operations and the operations that act on the data itself are runtime operations. In various implementations, any of the operations are implemented as hardware instructions as part of an instruction set architecture or that is invoked in any technically feasible manner.

Figure 3:
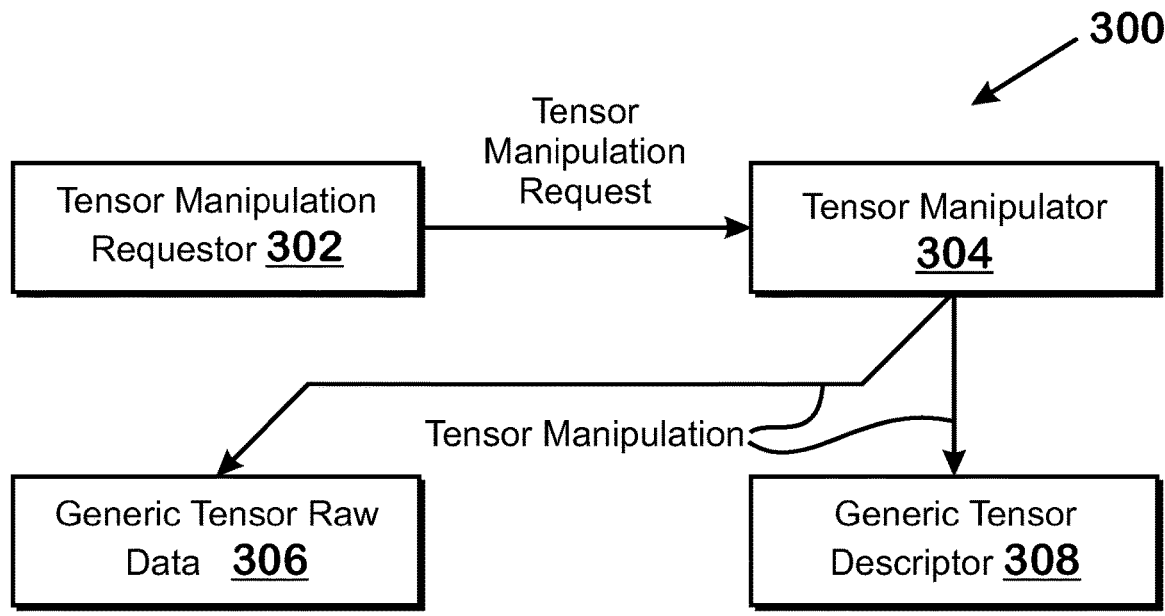
FIG. 3 is a block diagram of a generic tensor manipulation system for manipulating generic tensors, according to an example.

FIG. 3 is a block diagram of a generic tensor manipulation system 300 for manipulating generic tensors, according to an example. The generic tensor manipulation system 300 includes a tensor manipulator requestor 302 and a tensor manipulator 304. The tensor manipulator requestor 302 requests tensor manipulations to be performed by the tensor manipulator 304. The tensor manipulations include any of the manipulations to the generic tensor raw data 306 and/or the generic tensor descriptor 308 described elsewhere herein. The tensor manipulator 304 is embodied as software executing on a processor, hardware (e.g., circuits), or a combination thereof. The tensor manipulation requestor 302 is also embodied as software executing on a processor, hardware (e.g., circuits), or a combination thereof.

Figure 4A:
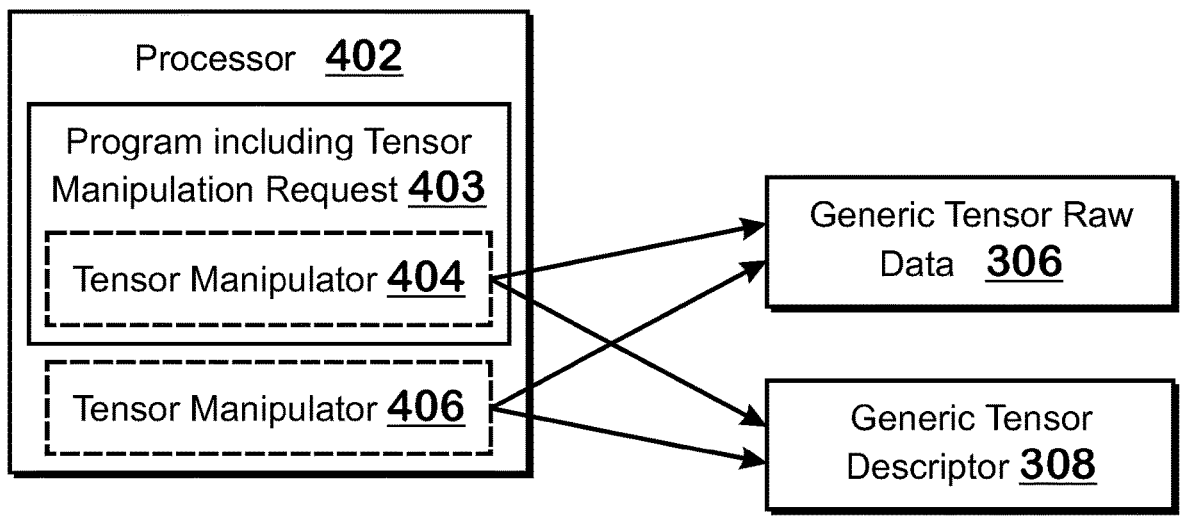
FIGS. 4A-4C illustrate several example implementations of the generic tensor manipulation system.
Figure 4B:
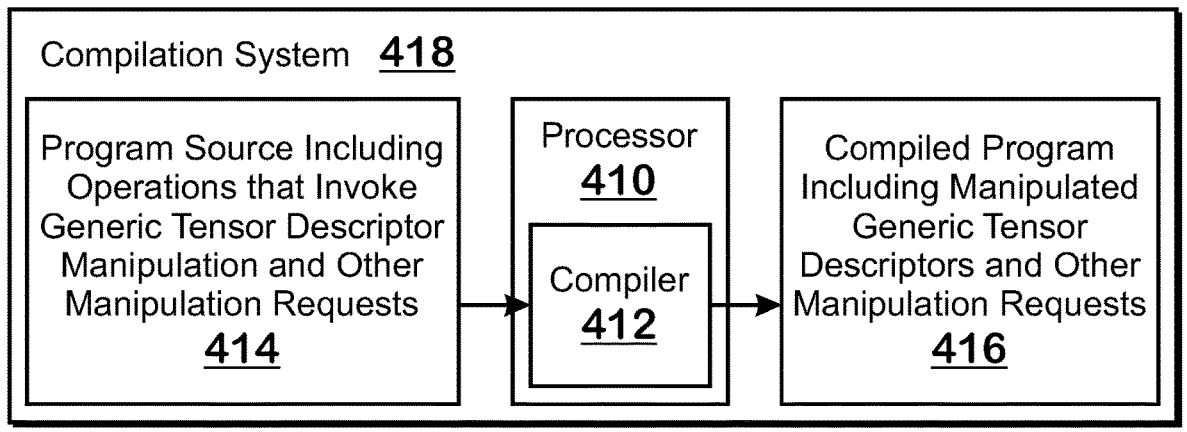
Figure 4B:
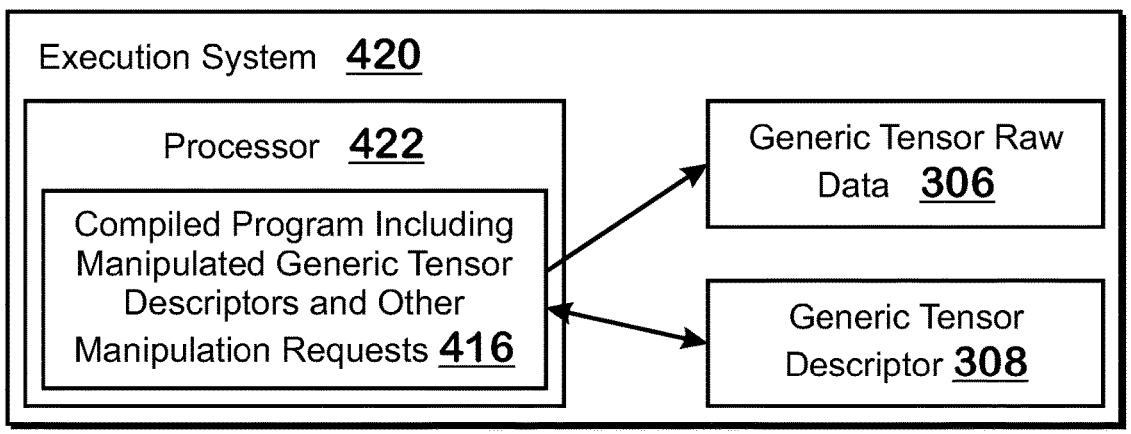
Figure 4C:
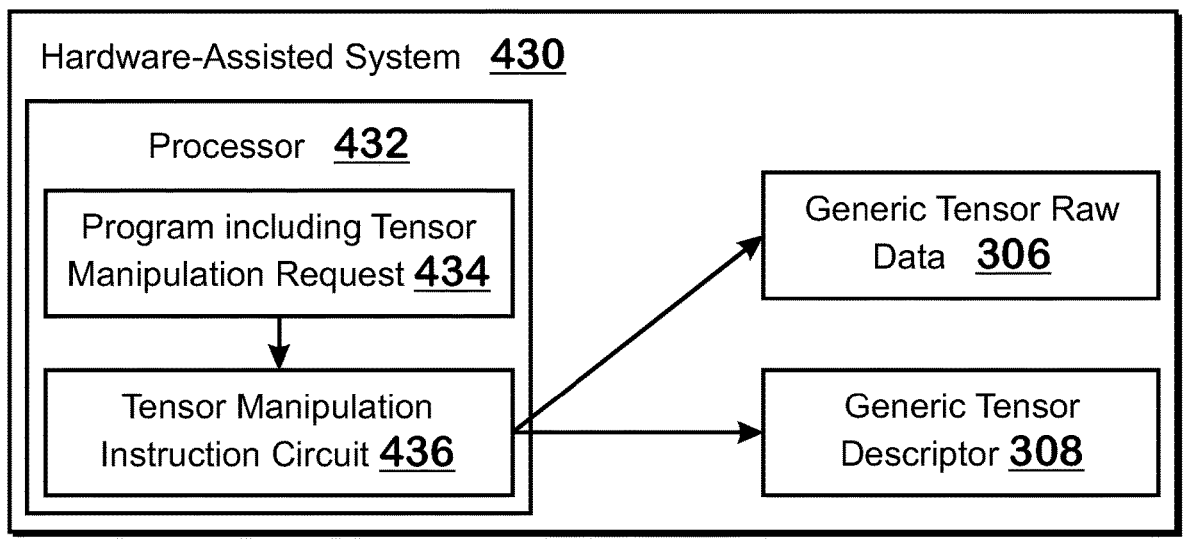

FIGS. 4A-4C illustrate several example implementations of the generic tensor manipulation system 300. In FIG. 4A, a processor 402 executes a program 403 that includes tensor manipulation requests. In some implementations, the program itself includes a tensor manipulator 404, and in other implementations, the program 403 accesses other software (such as a library or a different thread or process) that includes a tensor manipulator 406. The in-program tensor manipulator 404 or the tensor manipulator 406 external to the program 403 manipulate the generic tensor raw data 306 and generic tensor descriptor 308 according to the operations for manipulating the generic tensor raw data and the generic tensor descriptor described elsewhere herein.

In FIG. 4B, a compilation system 418 includes a processor 410 that executes a compiler 412. The compiler 412 analyzes program source 414. The program source 414 includes operations that invoke manipulation of a generic tensor descriptor. In some situations, the program source 414 also includes other manipulation requests, such as requests to manipulate the generic tensor raw data 306.

In the compilation system 418, the compiler 412 compiles the program 414 to generate the compiled program 416. The compilation includes processing operations that invoke generic tensor descriptor manipulation. More specifically, the program source 414 includes at least one operation to manipulate a generic tensor descriptor, examples of which are provided herein. The program source 414 also includes operations that use the manipulated generic tensor descriptor. Instead of compiling the program 414 such that the program 414 the operations to manipulate the generic tensor descriptors, the compiler 412 itself performs the operations to manipulate the generic tensor descriptors. The compiler 412 also compiles the operations that use the manipulated generic tensor descriptors to use the generic tensor descriptors as modified by the compiler 412. These compiler-based generic tensor descriptor manipulation operations are possible for generic tensor descriptors that are known at compile time and result in a performance boost for the compiled program 416 as compared with performing such manipulations by the compiled program 416. The compiler 412 also compiles the other manipulation requests including requests to manipulate the generic tensor raw data 306 to generate the compiled program 416.

The execution system 420 includes a processor 422 that executes the compiled program 416. When executed, the compiled program performs the operations to manipulate the generic tensor raw data 306 and accesses the manipulated generic tensor descriptors 308 and manipulated generic tensor raw data 306 as specified by the program source 414.

In some implementations, the compilation system 418 is the same system as the execution system 420 and in other implementations, the compilation system 418 is a different system than the execution system 420.

In FIG. 4C, a hardware-assisted system 430 includes a processor 432 that includes a program 434. The program includes tensor manipulation instructions. When executed, the program 434 requests tensor manipulation instruction circuits 436 to perform the requested tensor manipulation instructions. The tensor manipulation instructions include one or more of instructions for manipulating generic tensor raw data 306 and/or instructions for manipulating generic tensor descriptors 308. In some implementations, these instructions are part of an instruction set architecture and the tensor manipulation instruction circuitry 436 executes such instructions. Execution of the instructions involves manipulating the generic tensor raw data 306, and/or manipulating generic tensor descriptors 308.

In FIGS. 4A-4C, the generic tensor raw data 306 and the generic tensor descriptors 308 are stored at any appropriate location such as a memory. In the descriptions of FIGS. 4A-4C, phrases such as "manipulating generic tensor raw data" means performing one or more of the operations described herein as operating on the generic tensor raw data, such as slice, reorder, copy, and combinations thereof, general matrix multiply, batched general matrix multiply, reduction of an n-dimensional generic tensor, and algorithm specific transformations of an n-dimensional generic tensor. Phrases such as "manipulating generic tensor descriptors" means performing one or more of the operations described herein as operating on the generic tensor generic tensor descriptors, such as slice, strided slice, pad, reorder, merge, embed, fold, and move slicing window.

FIGS. 4A-4C present examples of the tensor manipulator requestor 302 and the tensor manipulator 304. In FIG. 4A, the tensor manipulator requestor 302 is the program 403 and the tensor manipulator 304 is the tensor manipulator 404. In FIG. 4B, the tensor manipulator requestor 302 is the program source 414 for manipulation of generic tensor descriptors 308 and is the compiled program 416 for generic tensor raw data 306. The tensor manipulator 304 is the compiler 412 for generic tensor descriptors 308 and the compiled program 416 for generic tensor raw data 306. In FIG. 4C, the tensor manipulator 304 is the tensor manipulation instruction circuitry 436 and the tensor manipulator requestor 302 is the program 434.

Figure 5:
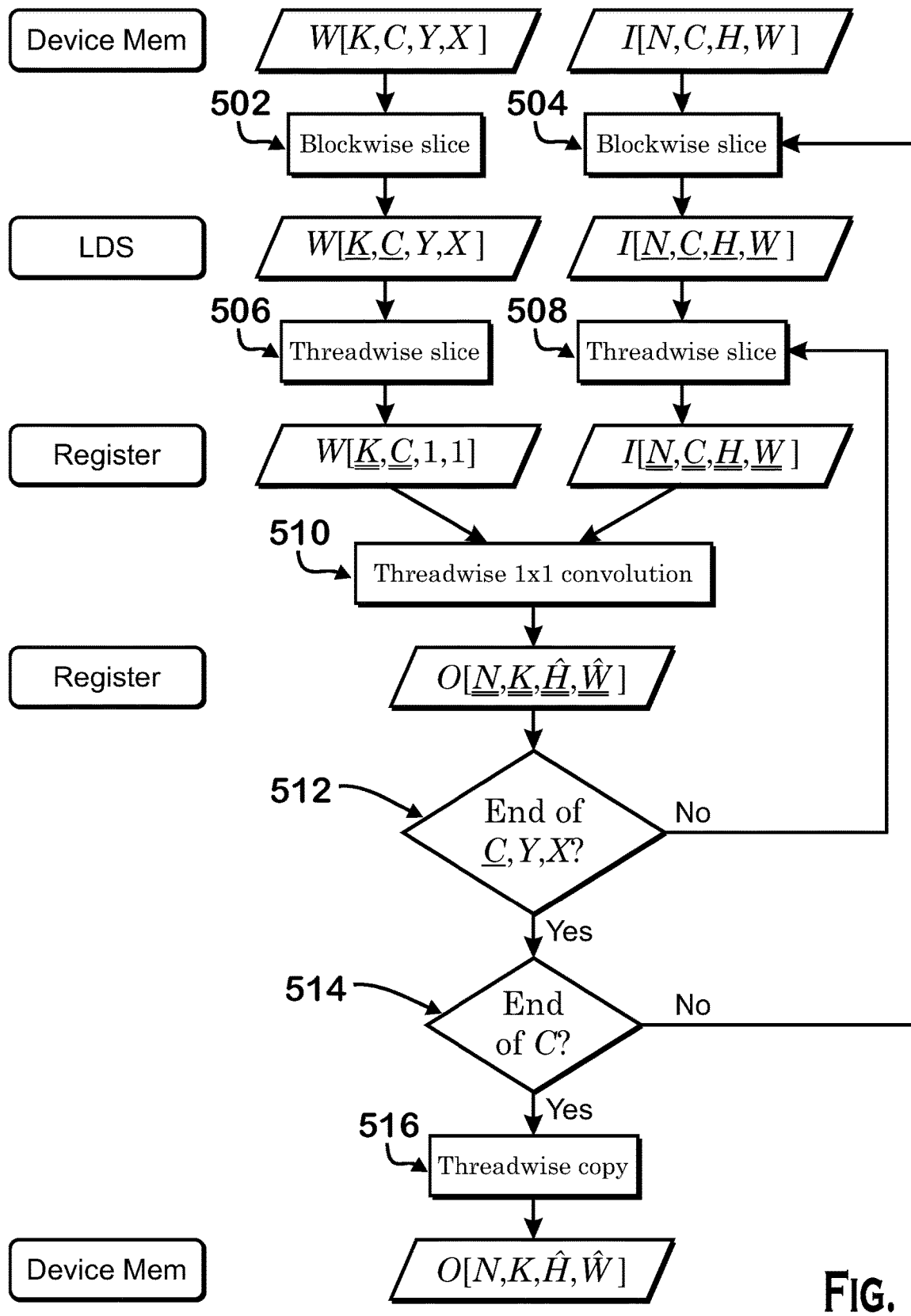
FIG. 5 illustrates an example of a convolutional neural network where operations to implement calculations through the neural network are implemented with operations on generic tensors described herein.

The above operations are combinable to implement any neural network. FIG. 5 illustrates a portion of an example of a convolutional neural network where operations to implement calculations through the neural network are implemented with operations on generic tensors described herein. Neural networks are modeled as interconnected layers of neurons. Each layer has connectivity to a previous layer (or to inputs to the network) and a subsequent layer (or to outputs of the network). Note that although a single convolution is illustrated, an entire neural network including one or more convolutions, as well as other layers such as GEMM, activation, reduction, and so on, may be built using the techniques described herein. Within a layer, each neuron has one or more inputs. Each input is an input value from a previous neuron or the input to the layer. Each input has an associated weight. Each neuron also defines neuron functions, which define how the inputs and weights combine to generate an output. At any particular layer, the weights are represented by an input tensor W, the inputs are represented by an input tensor I, and the outputs are represented by an output tensor O. In the following notation, each such tensor has four dimensions, which are as follows:

For the weight tensor, C is the input channel, where a "channel" is a portion of an input image (like a color). K is the output channel—that is, the channel in which the output for the weights will go. X and Y are height and width of the weights.

For the input tensor, C is the channel, N is the batch number, where a batch represents a different convolution, and H and W are height and width. For the output tensor, $\hat{H}$ and $\hat{W}$ are height and width of the outputs, N is the batch number, and K is the output channel number.

In the example of FIG. 5, a direct convolution operation is performed. In this direct convolution operation, the weight tensor W is convolved with the input tensor I to obtain the output tensor O: $W[K, C, Y, X] * I[N, C, H, W] = O[N, K, \hat{H}, \hat{W}]$.

In FIG. 5, one bar under a dimension index means the dimension is sliced once and two bars means the dimension is sliced twice. A "1" for a dimension number means the dimension is reduced to 1 index. "Device mem" refers to a general memory for a GPU (which, in one example, is an APD 116). "LDS" is a local data share, which is local to, and accessible by elements of a compute unit 132 and not outside of the same compute unit 132 as the LDS. Registers are lower level constructions, as is generally known, that are available to functional units (e.g., SIMD units 138) of the GPU.

In the example operations of FIG. 5, a processing entity such as a work-group executing on the processor 102 performs a blockwise sliced copy operation, by first performing a slice transformation operation on the weight tensor W in device memory, which limits the index range in the K and C dimensions, and then copying the raw data in the slicing window to the LDS, at operation 502. A processing entity such as a work-group executing on the processor 102 performs a blockwise sliced copy operation, by first performing a slice transformation operation on the input tensor I by limiting the index range in the N, C, H, and W dimensions, and then copying the raw data in the slicing window to LDS, at operation 504. A blockwise sliced copy operation is a sliced copy operation that occurs by multiple threads executing in parallel inside one work-group (aka "block"), where each such thread performs a portion of the sliced copy operation. In some implementations, each such thread is a CPU thread executing on the processor 102. In other implementations, each such thread is a work-item executing on an APD 116. Both the blockwise sliced copy operation on the weight tensor and the blockwise sliced copy operation on the input tensor occur with a copy, from device memory to the LDS, these operations are considered operations on the tensor raw data itself. Because a sliced copy operation involves copying multiple items of data, the blockwise sliced copy operations divide the data to be copied among a block of threads, each of which copies data specified for that thread to the LDS. A processing entity such as a work-item or processor 102 performs a threadwise sliced copy operation at operation 506 by first performing a slice transformation on the weight tensor in LDS, resulting in a tensor including a single element in Y and X dimensions and in a reduction in length in the K and C dimensions, and then copying the resulting tensor raw data into registers. Similarly, at operation 508, a processing entity performs a thread-wise sliced copy operation on the input tensor in LDS and stores the resulting elements into registers. At operation 510, a processing entity performs a thread-wise 1 by 1 convolution to produce an output tensor, which is stored in registers, as shown. At operation 512, if there are more elements in the sub-portion of W[K, C, Y, X] shown as C, Y, X, then operations 506 and 508, and subsequent operations, are again performed, and if not, then operation 514 is performed. At operation 514, if there are more elements in the sub-portion of W[K, C, Y, X] shown as C, then operation 516 is performed. At operation 516, threads copy the output elements of the output tensor generated by operation 510 to device memory, which results in the output tensor O[N, K, Ĥ, Ŵ] being stored in the device memory.

Note that FIG. 5 illustrates a specific example of a combination of operations on generic tensors to produce a specific result. However, the operations on generic tensors described herein are usable in any technically feasible manner to produce any result. As illustrated in FIG. 5, these operations are, in various implementations, used to "compose" operations for neural network calculations by providing individual operations that are executed by different execution threads that produce results which are then combined to generate an output. In addition, the operations allow copying by different execution threads of data to be processed from more generalized memory (e.g., device memory) through a memory hierarchy to more specialized memory (e.g., LDS and registers).

Figure 5A:
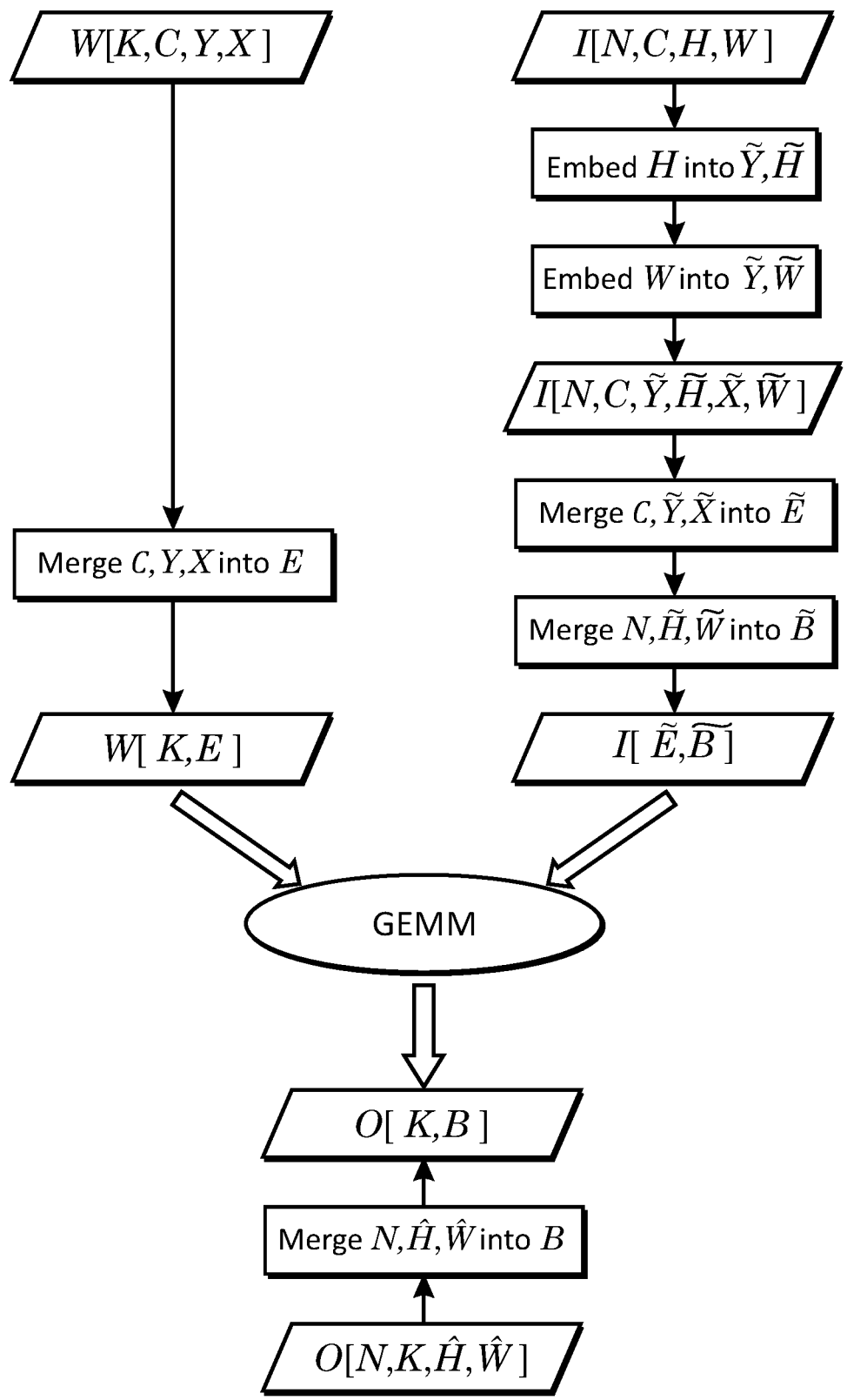
FIG. 5A illustrates an example technique for converting a convolution operation into a GEMM operation, using generic tensor operations.

FIG. 5A illustrates an example technique for converting a convolution operation that operates on "normal" tensors, into a GEMM operation that operates on "generic" tensors. In this convolution operation, the weight tensor W[K, C, Y, X] is convolved with the input tensor I[N, C, H, W] to obtain the output tensor O[N, K, Ĥ, Ŵ]: W[K, C, Y, X] *I[N, C, H, W]=O[N, K, Ĥ, Ŵ]. For simplicity but without losing generality, this example assumes the convolution filter stride and dilation are both 1, and the padding size for the input tensor is 0.

In FIG. 5A, a parallelogram means a generic tensor. Note that each of W[K, C, Y, X], I[N, C, H, W], and O[N, K, Ĥ, Ŵ] is not only a generic tensor, but also a "normal" tensor by definition, which is associated with a constant "stride vector". A rectangle means an operation on generic tensor descriptor, which takes a generic tensor descriptor and creates another generic tensor descriptor but does not operate on any generic tensor raw data. A single-line arrow indicates a generic tensor descriptor is passed to or produced by a transformation operation on generic tensor descriptor. An oval means an operation on generic tensor raw data, which takes the raw data from one or multiple generic tensors, to produce raw data for one or more generic tensors. A bold arrow indicates generic tensor raw data is passed to or produced by an operation on generic tensor raw data.

In the example operations of FIG. 2, the C, Y and X dimensions of the 4-D weight tensor W[K, C, Y, X] are merged to create the E dimension, and as a result, a 2-D weight generic tensor W [K, E] is created, which is not a "normal" tensor. The weight generic tensor W [K, E] occupies the same part of memory as the original weight tensor W[K, C, Y, X], which is a "normal" tensor.

The H dimension of the input tensor I[N, C, H, W] is embedded into $\tilde{Y}$ and $\tilde{H}$ dimensions, and W dimension of the input tensor I[N, C, H, W] is embedded into $\tilde{X}$ and $\tilde{W}$ dimensions. The $\tilde{Y}$ and $\tilde{X}$ dimension have the same lengths as Y and X dimension of weight tensor W[K, C, Y, X] respectively, and the $\tilde{H}$ and $\tilde{W}$ dimensions have the same lengths as the $\hat{H}$ and $\hat{W}$ dimensions of the output tensor O[N, K, $\hat{H}$, $\hat{W}$]. The mapping from indices of $\tilde{Y}$ and $\tilde{H}$ dimension ($I_{\tilde{Y}}$, $I_{\tilde{H}}$) to index of H dimension $I_H$ is $I_H = I_{\tilde{Y}} + I_{\tilde{H}}$. The mapping from indices of $\tilde{X}$ and $\tilde{W}$ dimension ($I_{\tilde{X}}$, $I_{\tilde{W}}$) to index of W dimension $I_W$ is $I_W = I_{\tilde{X}} + I_{\tilde{W}}$. After these two embed operations, a 6-D input generic tensor I[N, C, $\tilde{Y}$, $\tilde{H}$, $\tilde{X}$, $\tilde{W}$] is created. The generic tensor I[N, C, $\tilde{Y}$, $\tilde{H}$, $\tilde{X}$, $\tilde{W}$] occupies the same part of memory as original normal tensor I[N, C, H, W].

The C, $\tilde{Y}$ and $\tilde{X}$ dimensions of the input tensor I[N, C, $\tilde{Y}$, $\tilde{H}$, $\tilde{X}$, $\tilde{W}$] are merged into the $\tilde{E}$ dimension, and the N, $\tilde{H}$ and $\tilde{W}$ dimensions of the input tensor I[N, C, $\tilde{Y}$, $\tilde{H}$, $\tilde{X}$, $\tilde{W}$] are merged into the $\tilde{B}$ dimension. The $\tilde{E}$ dimension has the same length as E dimension of weight merged tensor W[K, E]. After these two merge operations, a 2-D input merged tensor I[$\tilde{E}$, $\tilde{B}$] is created. The generic tensor I[$\tilde{E}$, $\tilde{B}$] occupies the same part of memory as original normal input tensor I[N, C, H, W], and the generic input tensor I[N, C, $\tilde{Y}$, $\tilde{H}$, $\tilde{X}$, $\tilde{W}$].

The N, $\hat{H}$ and $\hat{W}$ dimensions of the output tensor O[N, K, $\hat{H}$, $\hat{W}$] are merged into the B dimension. The B dimension has the same length as the $\tilde{B}$ dimension of input merged tensor I[$\tilde{E}$, $\tilde{B}$]. After the merge operation, a 2-D output generic tensor O[K, B] is created. The generic tensor O[K, B] occupies the same part of memory as original normal output tensor O[N, K, $\hat{H}$, $\hat{W}$].

Note that every operation described above only operates on a generic tensor descriptor, not tensor raw data. Every generic tensor created by the transformation operations on tensor descriptors shares the same tensor raw data in memory with the original tensor the operations operate on. In other words, there is no data movement in memory or computation for tensor raw data during these operations.

The operations described above create the generic weight tensor W[K, E], generic input tensor I[$\tilde{E}$, $\tilde{B}$] and generic output tensor O[K, B]. A GEMM operation on generic tensor raw data is then carried out on these 2-D generic tensors W[K, E]·I[$\tilde{E}$, $\tilde{B}$]=O[K, B]. The resulting generic tensor raw data O[K, B] is equivalent to the result of convolution O[N, K, $\hat{H}$, $\hat{W}$]. The GEMM operation needs to operate on generic tensor raw data, not just normal tensor raw data.

Note that the operations on generic tensor descriptor can either be carried out by the compiler at software compile time, or by software running at run time, or by dedicated instructions available in hardware, or combination of them. The GEMM operation is implemented for the hardware that will be used to carry out on operation. However, any feasible type of hardware may be used.

Figure 6:
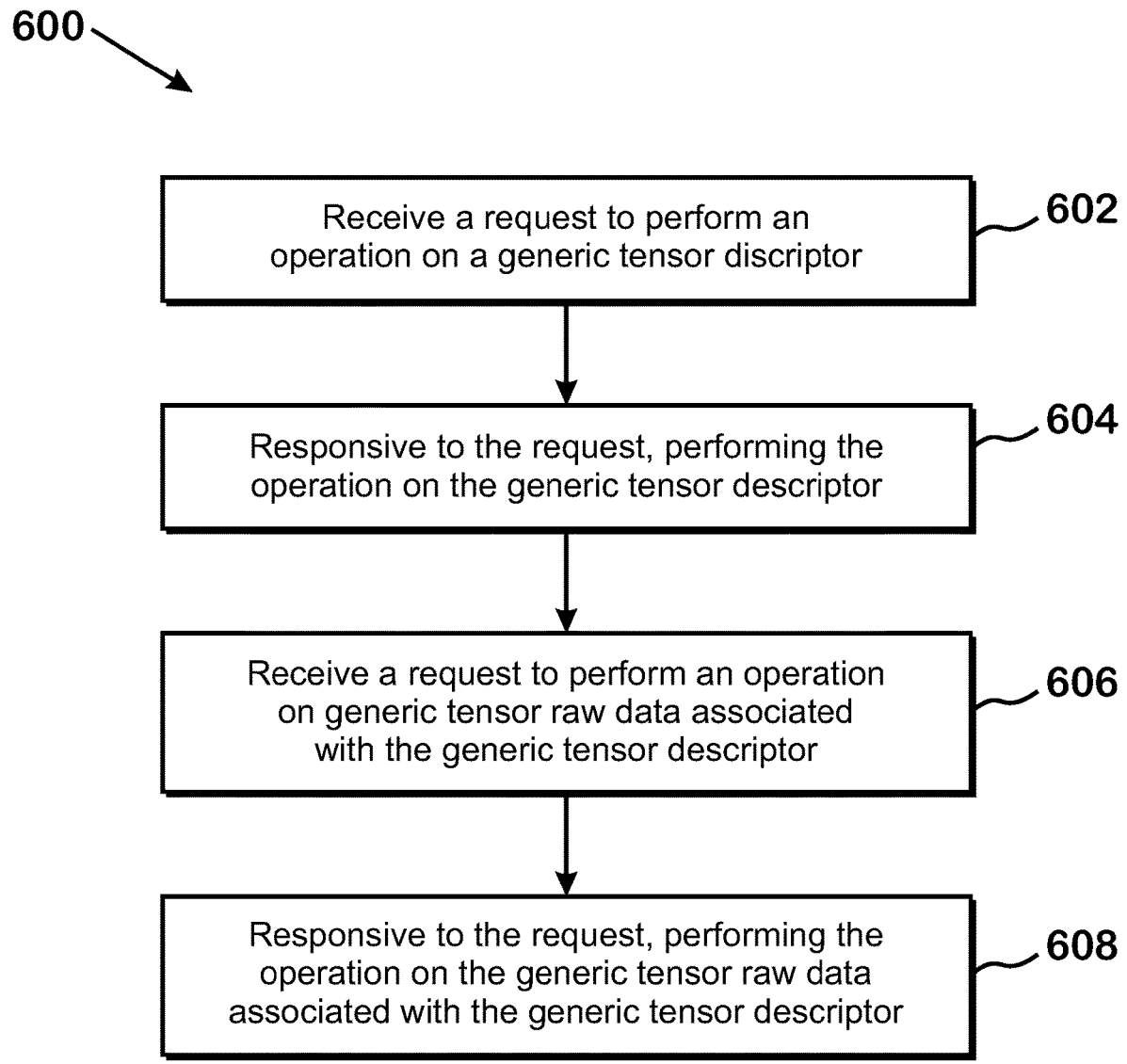
FIG. 6 is a flow diagram of a method for performing tensor operations, according to an example.

FIG. 6 is a flow diagram of a method 600 for performing tensor operations, according to an example. Although described with respect to the system of FIGS. 1-5, those of skill in the art will recognize that any system, configured to perform the steps of method 600 in any technically feasible order, falls within the scope of the present disclosure.

At step 602, a tensor manipulator requestor 302 transmits a request to manipulate a generic tensor descriptor to a tensor manipulator 304. As described elsewhere herein, some operations that operate on generic tensors modify the generic tensor descriptor, and not the raw data of the generic tensor. The generic tensor descriptor is a construct that indicates how to obtain data elements of generic tensor raw data given an input multi-index. Manipulation of a generic tensor descriptor to form a new generic tensor descriptor allows treatment of generic tensor raw data as if that generic tensor raw data were different tensors without having to modify the generic tensor raw data. A large number of operations on generic tensor descriptors are provided herein. At step 604, the tensor manipulator 304 performs the requested operation to manipulate the generic tensor descriptor.

At step 606, the tensor manipulator requestor 302 requests the tensor manipulator 304 perform an operation on generic tensor raw data associated with the generic tensor descriptor. A large variety of operations are described herein. In contrast to the operations on the generic tensor descriptor, operations on the generic tensor raw data modifies the contents of the generic tensor raw data or generates new generic tensor raw data based on the specific operations requested. At step 608, the tensor manipulator 304 performs the operation requested at step 606.

It is possible for the tensor manipulator requestor 302 that performs the operations of step 602 to be a different tensor manipulator requestor 302 as the tensor manipulator requestor that performs the operations of step 606. In one example, program source code 414 requests that a compiler 412 perform at least some tensor descriptor manipulations and in response, the compiler 412 performs the tensor descriptor manipulations. When compiled, the compiled program 416 includes the requests to perform the manipulations on the generic tensor raw data (e.g., via function calls, API calls, or explicitly via specific instructions), and thus is the tensor manipulator requestor 302 and the compiled program 416 or other entity that performs the manipulations on the generic tensor raw data is the tensor manipulator 304. As described above, FIGS. 4A-4C illustrate several example systems for performing the operations of FIG. 6.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, and the SIMD units 138) are, in various implementations, implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for manipulating a generic tensor, the method comprising:
receiving a request to perform an operation on generic tensor raw data associated with a generic tensor; and
responsive to the request, performing the operation on generic tensor raw data, the performing the operation including mapping a tensor coordinate specified by the request to a memory address, the mapping including evaluating a delta function associated with a type of the request,
wherein the operation generates a modified generic tensor descriptor based on a generic tensor descriptor without modifying the generic tensor raw data,
wherein the delta function indicates a difference between a previously calculated memory address and the memory address, the difference determined based on a difference between the tensor coordinate and a previously calculated tensor coordinate for the previously calculated memory address.

2. The method of claim 1, wherein the operation comprises one of:
a slice, a strided slice, a pad, a reorder, a fold, a merge, an embed, and a move slicing window operation.

3. The method of claim 1, wherein the operation comprises one of:
a sliced copy, a general matrix multiply or batched general matrix multiply, a reduction, and an algorithm-specific transformation.

4. The method of claim 1, wherein the generic tensor raw data comprises:
data elements of the generic tensor.

5. The method of claim 1, wherein:
the request and operation are specified by instructions of a program.

6. The method of claim 1, wherein:
the request is specified by a compiled program; and
the operation is performed by the compiled program.

7. The method of claim 1, wherein:
the request is specified by a program; and
the operation is performed by a specialized hardware circuit configured to perform at least one operation on generic tensor descriptors or on generic tensor raw data.

8. The method of claim 1, wherein the generic tensor descriptor indicates any one or a combination of the following for the generic tensor: a type of generic tensor, a number of dimensions of the generic tensor, lengths for each dimension of the generic tensor, or a base address for the generic tensor raw data.

9. The method of claim 1, wherein the generic tensor descriptor indicates how to translate one or more index values into one or more memory addresses for generic tensor raw data associated with the generic tensor.

10. The method of claim 9, wherein the one or more index values are translated into one or more memory addresses for the generic tensor raw data where the translating includes a reduction of dimensionality for a merged tensor or an increase of dimensionality for an embedded tensor.

11. A system for manipulating a generic tensor, the system comprising:
a memory storing a generic tensor descriptor; and
a processor, configured to:
receive a request to perform an operation on generic tensor raw data associated with a generic tensor; and
responsive to the request, performing the operation on generic tensor raw data, the perform the operation including mapping a tensor coordinate specified by the request to a memory address, the mapping including evaluating a delta function associated with a type of the request,
wherein the operation generates a modified generic tensor descriptor based on the generic raw tensor descriptor without modifying the generic tensor raw data,
wherein the delta function indicates a difference between a previously calculated memory address and the memory address, the difference determined based on a difference between the tensor coordinate and a previously calculated tensor coordinate for the previously calculated memory address.

12. The system of claim 11, wherein the operation comprises one of:
a pad, a slice, a strided slice, a reorder, a fold, a merge, an embed, and a move slicing window operation.

13. The system of claim 11, wherein the operation comprises one of:
a sliced copy, a general matrix multiply or batched general matrix multiply, a reduction, and an algorithm-specific transformation.

14. The system of claim 11, wherein the generic tensor raw data comprises:
data elements of the generic tensor.

15. The system of claim 11, wherein:
the request and operation are specified by instructions of a program.

16. The system of claim 11, wherein:
the request is specified by a compiled program; and
the operation is performed by the compiled program.

17. The system of claim 11, wherein:
the request is specified by a program; and
the operation is performed by a specialized hardware circuit configured to perform at least one operation on generic tensor descriptors or on generic tensor raw data.

18. The system of claim 11, wherein the generic tensor descriptor indicates any one or a combination of the following for the generic tensor: a type of generic tensor, a number of dimensions of the generic tensor, lengths for each dimension of the generic tensor, or a base address for the generic tensor raw data.

19. The system of claim 11, wherein the generic tensor descriptor indicates how to translate one or more index values into one or more memory addresses for generic tensor raw data associated with the generic tensor.

20. The system of claim 19, wherein the one or more index values are translated into one or more memory addresses for the generic tensor raw data where the translating includes a reduction of dimensionality for a merged tensor or an increase of dimensionality for an embedded tensor.

21. A non-transitory computer-readable medium storing instructions that, when executed by a processor, cause the processor to manipulate a generic tensor, by:
receiving a request to perform an operation on generic tensor raw data associated with a generic tensor; and
responsive to the request, performing the operation on generic tensor raw data, the performing the operation including mapping a tensor coordinate specified by the request to a memory address, the mapping including evaluating a delta function associated with a type of the request,
wherein the operation generates a modified generic tensor descriptor based on a generic tensor descriptor without modifying the generic tensor raw data,
wherein the delta function indicates a difference between a previously calculated memory address and the memory address, the difference determined based on a difference between the tensor coordinate and a previously calculated tensor coordinate for the previously calculated memory address.

22. The non-transitory computer-readable medium of claim 21, wherein the operation comprises one of:
a slice, a strided slice, a pad, a reorder, a fold, a merge, an embed, and a move slicing window operation.

* * * * *